(12) United States Patent
Purdy et al.

(10) Patent No.: US 8,168,355 B2
(45) Date of Patent: May 1, 2012

(54) METHOD OF IMAGING IN CRYSTALLINE COLLOIDAL ARRAYS

(75) Inventors: Sean Purdy, Cincinnati, OH (US);
Eldon L. Decker, Gibsonia, PA (US);
Calum H. Munro, Wexford, PA (US);
Noel R. Vanier, Wexford, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 1168 days.

(21) Appl. No.: 11/958,890

(22) Filed: Dec. 18, 2007

(65) Prior Publication Data

US 2009/0155545 A1 Jun. 18, 2009

(51) Int. Cl.
*G03C 5/56* (2006.01)

(52) U.S. Cl. ............... 430/9; 430/10; 430/15; 430/290; 430/293; 430/945

(58) Field of Classification Search .................. None
See application file for complete search history.

(56) References Cited

U.S. PATENT DOCUMENTS

| | | | |
|---|---|---|---|
| 4,818,070 A * | 4/1989 | Gunjima et al. | 349/93 |
| 5,122,905 A | 6/1992 | Wheatley et al. | |
| 5,281,370 A | 1/1994 | Asher et al. | |
| 5,527,386 A | 6/1996 | Statz | |
| 5,624,731 A | 4/1997 | Desjardins | |
| 5,711,884 A | 1/1998 | Asher et al. | |
| 5,783,120 A | 7/1998 | Ouderkirk et al. | |
| 5,824,733 A | 10/1998 | Dobert et al. | |
| 5,932,309 A | 8/1999 | Smith et al. | |
| 6,299,979 B1 | 10/2001 | Neubauer et al. | |
| 6,337,131 B1 | 1/2002 | Rupaner et al. | |
| 6,894,086 B2 | 5/2005 | Munro et al. | |
| 2004/0146811 A1 | 7/2004 | Yang et al. | |
| 2007/0100026 A1 | 5/2007 | Munro et al. | |
| 2007/0165903 A1 | 7/2007 | Munro et al. | |

FOREIGN PATENT DOCUMENTS

| | | |
|---|---|---|
| EP | 0955323 A1 | 11/1999 |
| KR | 1020070099838 A | 10/2007 |
| WO | WO 02/44728 A2 | 6/2002 |

OTHER PUBLICATIONS

Pfaff et al., "Angle-Dependent Optical Effects Deriving from Submicron Structures of Films and Pigments", Chem. Rev. 1999, 99, 1963-1981.

* cited by examiner

*Primary Examiner* — John A. McPherson
(74) *Attorney, Agent, or Firm* — Julie W. Meder (57) ABSTRACT

A method of producing an image in the crystalline colloidal array is disclosed. The method includes providing an ordered array of particles received within a curable matrix composition; curing a first portion of the matrix composition, wherein the first cured portion diffracts radiation at a first wavelength; curing another portion of the matrix composition, wherein the other cured portion diffracts radiation at another wavelength; and exposing the array to radiation to exhibit an image.

21 Claims, 4 Drawing Sheets

METHOD OF IMAGING IN CRYSTALLINE COLLOIDAL ARRAYS

FIELD OF THE INVENTION

This invention relates to imaging in crystalline colloidal arrays, more particularly to creating images in crystalline colloidal arrays by exposure to actinic radiation.

BACKGROUND OF THE INVENTION

Radiation diffractive materials based on crystalline colloidal arrays have been used for a variety of purposes. A crystalline colloidal array (CCA) is a three-dimensional ordered array of mono-dispersed colloidal particles.

Such colloidal dispersions of particles can form crystalline structures having lattice spacings that are comparable to the wavelength of ultraviolet, visible or infrared radiation. These crystalline structures have been used for filtering narrow bands of selected wavelengths from a broad spectrum of incident radiation, while permitting the transmission of adjacent wavelengths of radiation. Prior devices have been created by dispersing particles in a liquid medium, whereby the particles self-align into an ordered array. The particles are fused together by mutual polymerization or by introducing a solvent that swells and fuses the particles together.

In other uses of CCAs, an ordered array is fixed in a matrix and may be used as colorants when the fixed array diffracts radiation in the visible spectrum. Alternatively, CCAs are fabricated to diffract radiation for use as optical filters, optical switches and optical limiters. While these CCAs use constant inter-particle spacing, a CCA may function as a sensor when the inter-particle spacing varies in response to stimuli.

Recently, such sensors have been produced from hydrogels containing a CCA polymerized within the hydrogel. The polymers of the hydrogel surrounding the CCA change conformation in response to a specific external stimulus. For example, the volume of the hydrogel can change in response to stimuli, including the presence of chemicals, such as metal ions in solution and organic molecules, such as glucose, making the devices useful for chemical analysis. In CCA devices, mono-dispersed highly charged colloidal particles are dispersed in a low-ionic strength liquid media. The particles self-assemble into a CCA due to their electrostatic charges. These ordered structures diffract radiation according to Bragg's law, wherein the radiation meeting the Bragg conditions are reflected while adjacent spectral regions that do not meet the Bragg conditions are transmitted through the device.

SUMMARY OF THE INVENTION

The present invention is directed to a method of producing an image comprising providing an imaging member comprising an array of elements received within a curable matrix composition; curing the matrix composition in a first portion of the imaging member by projecting laser radiation onto the first portion in the configuration of an image, such that the first cured portion exhibits a first optical property; altering another portion of the imaging member; and curing the other portion of the matrix composition, such that the other cured portion exhibits a different optical property from the first portion. The present invention also includes a method of producing an image comprising providing an array of particles received within a curable matrix composition; curing a first portion of the matrix composition through a grey-scale positive or negative mask of an image; and curing another portion of the matrix composition.

The present invention further includes a method of producing a multi-color image in a crystalline colloidal array comprising providing a plurality of imaging members each imaging member comprising an ordered array of particles received within a curable matrix composition; providing an image mask for each imaging member; exposing each imaging member to actinic radiation through one of the image masks to produce a plurality of imaged members, each imaged member having a cured image portion and an uncured background portion; curing the uncured portions of the imaged members such that the cured image portion and the cured background portion diffract radiation at differing wavelengths; and stacking the imaged members such that the diffraction of radiation from the cured image portions yields a multi-color image.

DETAILED DESCRIPTION OF THE INVENTION

The present invention includes a method of producing an image in an imaging member, i.e., a device in which an image may be produced to yield an imaged member. In one embodiment, the imaging member includes an array of elements that are received in a curable matrix composition. The image is produced by exposing one portion of the imaging member to laser radiation and altering another portion of the imaging member, such that the first portion and the other portion diffract radiation at different wavelengths, rendering the image detectable. In all embodiments described herein, the first portion may correspond to the image with the second or other portions as a background, or vice versa, wherein the first portion is a background to an image produced in the second portion. The image may be detectable, for example, to authenticate or identify an article to which it is applied, or it may be decorative. The image is detectable by exposing the image to radiation and detecting radiation reflected from the image. Each of the exposing radiation and reflected radiation may be in the visible or non-visible spectrum. In certain embodiments, an image produced according to the present invention may be detectable with the naked eye. In other embodiments, the image is detectable by using an optical device (such as a spectrophotometer) to retrieve or view the image.

In one embodiment, the array of elements is an ordered periodic array of particles (a crystalline colloidal array or CCA), which are held in a matrix composition. By ordered periodic array of particles, it is meant an array of particles that diffracts radiation. Parallel layers or planes formed by the periodic array of particles interact with incident radiation in accordance with Bragg's law. The diffracted light is goniochromatic, i.e. the color depends on the viewing angle. The diffraction wavelength of the light at a given angle is proportional to the distance between the Bragg planes formed by the periodic array of particles, which is proportional to the particle diameter for close-packed spheres. The diffraction wavelength also depends on the effective refractive index of the imaging member. The effective refractive index of the imaging member is closely approximated as a volume average of the refractive index of the materials of the imaging member, including the particles and the matrix material surrounding the particles. The intensity of the diffracted light is dependent on the refractive index variation within the imaging member as dictated by the arrangement of the particles and the surrounding matrix. The number of layers that are formed by the array of particles and the matrix and the refractive index contrast between alternating layers can also influence the diffraction intensity. More particle layers produce greater diffraction intensity. Higher refractive index contrast between alternating layers also produces greater diffraction intensity. Higher refractive index contrast between alternating layers can be achieved by using particles and matrix having a relative large difference in their respective indices of refraction Alternatively, directionally expanding the particles and/or the matrix can alter the layered structure and increase the refractive index contrast between the layers.

In one embodiment, the matrix in which the particles are held is produced from a curable matrix composition, which may be an organic polymer such as acrylic polymers, polystyrene, polyurethane, alkyd polymers, polyester, siloxane-containing polymers, polysulfides, epoxy-containing polymers, or polymers derived from an epoxy-containing polymer. Upon curing of the matrix material, the relative positions of the particles may be fixed such that the inter-particle spacing may be fixed.

In one embodiment, the particles are composed of a material different from the matrix. Suitable materials for the particles include polystyrene, polyurethane, acrylic polymers, alkyd polymers, polyester, siloxane-containing polymers, polysulfides, epoxy-containing polymers, and polymers derived from epoxy-containing polymers, as well as inorganic materials, such as metal oxides (e.g., alumina, silica or titanium dioxide) or semiconductors (e.g., cadmium selenide) or composites of these materials.

In one embodiment, the particles have a generally unitary structure. Alternatively, the particles may have a core-shell structure where the core is produced from a different composition from the shell composition. Suitable compositions for the particle core include organic polymers such as polystyrene, polyurethane, acrylic polymers, alkyd polymers, polyester, siloxane-containing polymers, polysulfides, epoxy-containing polymers, or polymers derived from epoxy-containing polymers, as well as inorganic materials, such as metal oxides (e.g., alumina, silica or titanium dioxide) or semiconductors (e.g., cadmium selenide). Suitable compositions for the shell include organic polymers (e.g., polystyrene, polyurethane, acrylic polymers, alkyd polymers, polyester, siloxane-containing polymers, polysulfides, epoxy-containing polymers, or polymers derived from epoxy-containing polymers), with the composition of the particle shell differing from the matrix material for a particular array of the core-shell particles. The shell material may be non-film-forming, meaning that the shell material remains in position surrounding each particle core without forming a film of the shell material, so that the core-shell particles remain as discrete particles within the polymeric matrix. As such, the array includes at least three general regions; namely, the matrix, the particle shell and the particle core. Alternatively, the shell material may be film-forming, such that the shell material forms a film around the cores. The core material and the shell material have different indices of refraction. In addition, the refractive index of the shell may vary as a function of the shell thickness in the form of a gradient of refractive index through the shell thickness. The refractive index gradient may be a result of a gradient in the composition of the shell material through the shell thickness.

An image may be produced in an imaging member having a CCA using actinic radiation as described below. Referring to the flow chart of FIG. 1A, in one embodiment, an array of particles is received within a curable matrix (step 10) to provide an imaging member. The imaging member may be produced by pre-arranging similarly charged particles in a periodic array on a substrate and coating the array of particles with a curable matrix composition. The periodic array of particles may be coated by applying a curable matrix composition onto the array by spraying, brushing, roll coating, gravure coating, curtain coating, flow coating, slot-die coating or ink-jet coating (as described in U.S. Pat. No. 6,894,086, incorporated herein by reference) or by embedding the array of particles into a coating composition on a substrate.

Figure 1A:
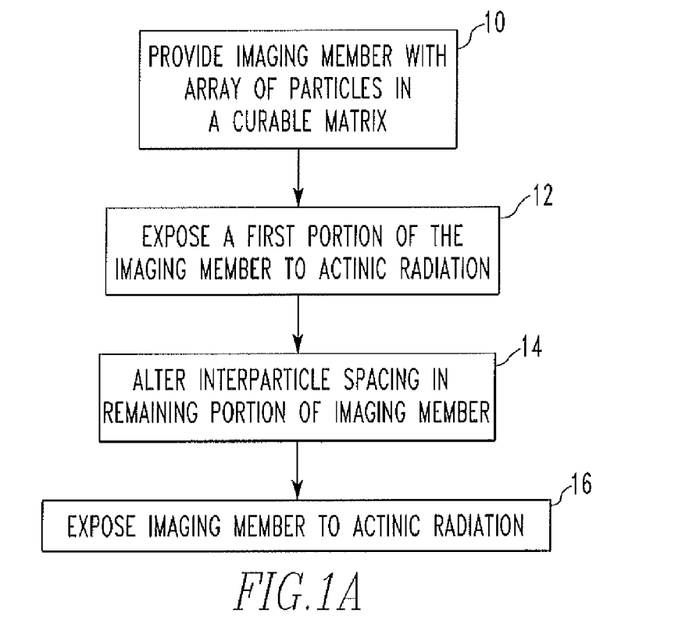
FIG. 1A is a flow chart of a method of producing an image according to the present invention.

In step 12, a first portion of the imaging member is exposed to actinic radiation to cure the matrix composition in the exposed portion of the imaging member. The remaining portion of the array in the imaging member that was not exposed to actinic radiation is treated to alter the inter-particle spacing of the particles in the remaining portion of the array (in step 14). After the inter-particle spacing of the particles in the array has been altered, in step 16, the imaging member is exposed to actinic radiation to cure the remaining portion of the imaging member. The first exposed portion of the imaging member diffracts radiation at a different wavelength band than the remaining portion of the imaging member. For example, the first portion of the imaging member may be exposed to actinic radiation by use of a mask or by focused laser radiation. In one embodiment, when the matrix composition is curable with ultraviolet (UV) radiation, such as an acrylate-based composition, the actinic radiation used to cure the matrix composition includes UV radiation.

In another embodiment, a first portion of the imaging member is exposed to actinic radiation to cure the curable matrix in the exposed portion of the imaging member. The remaining unexposed portion of the imaging member is altered in a manner that disturbs the array and prevents the remaining portion from diffracting radiation. An ordered periodic array of particles may be disturbed by various techniques including, for example, by applying a solvent to the array that at least partially dissolves the particles, overheating the unexposed portion to destroy the particles or by mechanically disrupting the particles.

Figure 1B:
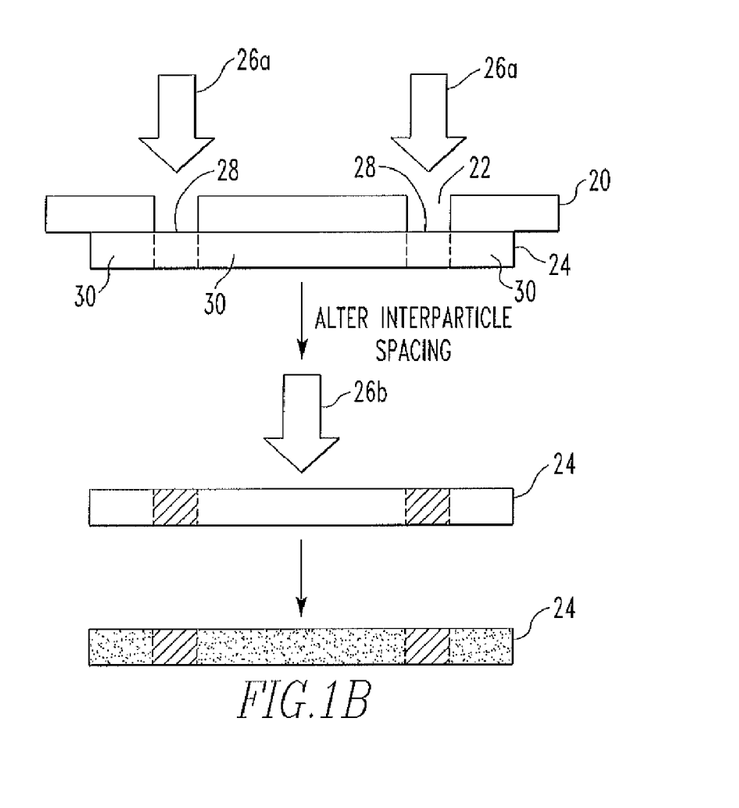
FIG. 1B is a schematic of producing an image in a CCA according to one embodiment of the present invention.

Referring to FIG. 1B, a mask 20 having openings 22 in a desired configuration of an image is laid over an imaging member 24 having an array of particles provided in a curable matrix composition. The imaging member is exposed to actinic radiation (as at 26a) through the openings 22 in the mask 20 to cure the exposed portions 28. The inter-particle spacing between the particles in the remaining portions 30 is altered and the imaging member 24 is exposed to actinic radiation 26b to cure all remaining portions 30. The openings in the mask may correspond to the image such that the first cured portion exhibits the image. Alternatively, the openings may correspond to a negative of the image, such that the first cured portion of the imaged member constitutes the background of the image. In either case, the imaged member exhibits an image due to differences in the wavelength of diffraction between the first cured portion and the other cured portion. The inter-particle spacing of the particles in the first cured portion is different from the inter-particle spacing of the other cured portion, thereby causing the first and other portions to diffract radiation at different wavelengths. By different wavelengths, it is meant that there is a discernable difference in the wavelength or band of wavelengths diffracted by the two portions of the imaged member. The difference in diffraction wavelength may be visible to the human eye or may be detectable by an optical device, such as a spectrophotometer or the like.

In one embodiment, a highly detailed image is produced in an imaging member comprising a CCA by using a transparency bearing a grey-scale negative image. The grey-scale negative image may be produced by converting a full-color image to a grey-scale negative image, which is then reproduced onto a transparency. In use, the transparency functions as a mask, such as shown in FIG. 1B. Actinic radiation passes through the transparency where there is no negative of the image, thereby curing a first portion of the matrix composition in the configuration of the image. The areas of the uncured portion of the matrix composition may constitute the background of the image. The inter-particle spacing in the CCA of the uncured portion is altered so that the inter-particle spacing of the CCA in the uncured portion is different from the inter-particle spacing of the first cured portion, and then the other portion is cured.

Alteration of the inter-particle spacing of particles in a CCA may be achieved by either increasing the dimensions of the particles so that the centers of the particles are further spaced apart from each other or by expanding the matrix composition to urge the particles away from each other. The particle dimensions may be increased by allowing monomers or other materials present in the uncured portion of the imaging member (e.g., solvents) to diffuse into the particles, such that the particles expand, thereby increasing the inter-particle spacing. Either core-shell particles (wherein the shell is receptive to diffusing of materials therein) or unitary structure particles may be expanded. Expansion of the particles to increase the particle dimensions may be enhanced by heating the uncured portion to increase the rate of diffusion of materials from the other curable matrix compositions into the particles. For a curable matrix composition containing monomers (including polymeric precursor components), the monomers (and/or polymeric precursor components) may diffuse into the particles of the uncured portion. Alternatively, a diffusible composition (such as a solvent) may be applied to the imaging member for diffusing into the particles. Application of a diffusible composition may be used in place of or in addition to diffusion of the matrix materials into the particles, such as for increasing the concentration of materials diffusing into the particles. In another embodiment, the matrix may be expanded by addition of monomers or a solvent (water or organic solvents) to swell the matrix composition (with or without expansion of the particles) and increase the inter-particle spacing. Alteration of the inter-particle spacing by diffusion of material into the particles and/or expansion of the matrix may also affect the refractive index contrast between the particles and the matrix, the refractive index contrast between alternating layers in the array, and/or the effective refractive index of the imaging member.

Following alteration of the inter-particle spacing, refractive index contrast, and/or effective refractive index, the matrix composition is cured. Curing of the matrix composition fixes the relative positions of the particles, so that the inter-particle spacing of the particles in the background portion of the imaging member differs from the previously cured image portion of the imaging member.

Figure 2:
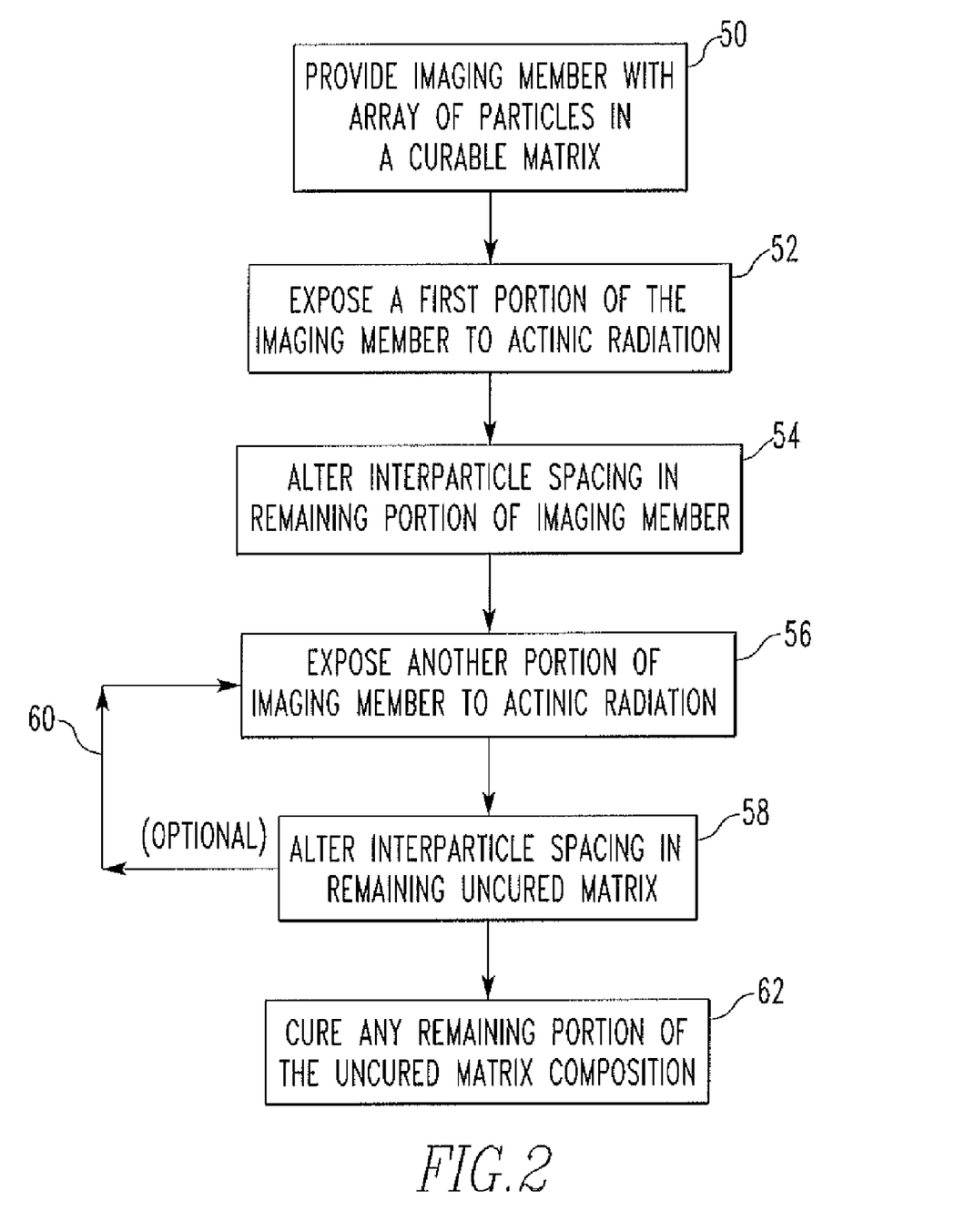
FIG. 2 is a flow chart of another embodiment of producing an image according to the method of the present invention.

The embodiments described herein may include an imaged member having a cured portion exhibiting an image (or a background of an image) and a second cured portion corresponding to the background of an image (or the image). However, referring to FIG. 2, the inter-particle spacing may be altered in more than one portion of the imaging member according to another embodiment of the invention. An array of particles is received within a curable matrix (step 50) as an imaging member. In step 52, a first portion of the imaging member is exposed to actinic radiation, followed by step 54 in which the inter-particle spacing in the remaining uncured portion is altered to create a second portion in the imaging member that diffracts radiation differently from the first portion of the imaging member. A portion of the uncured matrix is exposed to actinic radiation in step 56, and the inter-particle spacing in the remaining uncured matrix portion is further altered in step 58. As indicated at step 60, this process of exposing a portion of uncured matrix to radiation and altering the inter-particle spacing in a remaining portion may be repeated several times before a final step 62 of curing any remaining uncured portion of the matrix composition. With each subsequent alteration of the inter-particle spacing (steps 56 and 58), the altered portion, when cured, diffracts radiation at a different wavelength from the other portions of the imaging member. In this manner, multiple wavelengths of radiation may be diffracted by an image in the CCA.

Figure 3A:
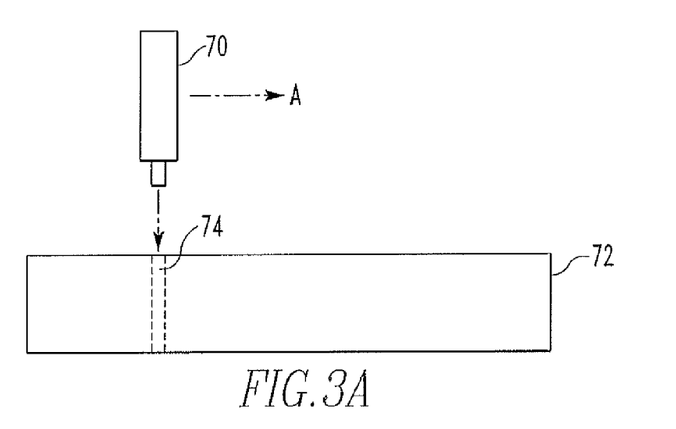
FIG. 3A is a schematic of using a single laser to image a CCA according to the present invention.
Figure 3B:
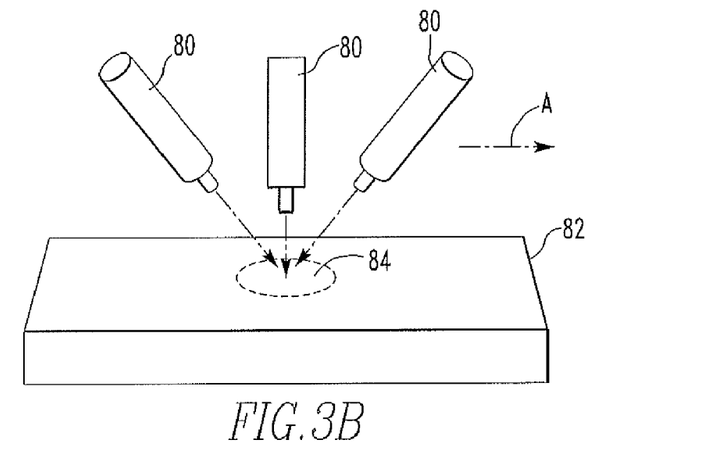
FIG. 3B is a schematic of using multiple lasers to produce an image in a CCA according to the present invention.

Alternatively, one or more lasers may provide actinic radiation to produce an image in an imaging member comprising a CCA. Referring to FIG. 3A, a single laser 70 may be focused onto an imaging member of an array of particles provided in a curable matrix composition 72. Movement of the laser across the imaging member, as shown by arrow A, creates a path of cured matrix composition corresponding to an image portion 74 following the pattern of movement of the laser 70. Alternatively, as shown in FIG. 3B, a plurality of lower-intensity lasers 80 may be focused into an array of particles provided in a curable matrix composition 82 at a common location 84 to provide sufficient actinic radiation at location 84 for curing of the matrix composition. The plurality of lasers 80 may be moved across the array of the curable matrix in a similar manner as laser 70.

Alternatively, a laser marking system may be employed to raster a laser across a periodic array of particles held in a polymeric matrix to produce an image in the imaging member. Use of a laser marking system allows for rapid changes in the image between imaging members, such as in a production environment. A series of imaging members may be imaged with a distinct customized image. Alternatively, a liquid crystal display (LCD) masking actinic radiation may also be used to block radiation in the configuration of an image to cure an image into an imaging member according to the present invention. An LCD may be controlled to customize the image in each imaging member produced in a production series. Similarly, a digital light projector providing actinic radiation may be used to create customized images in an imaging member. These examples of mass customization of images in an imaging member are not meant to be limiting. Other systems may be used to expose a curable matrix composition receiving an ordered array of particles, wherein the configuration of the actinic radiation is readily changeable.

Figure 4A:
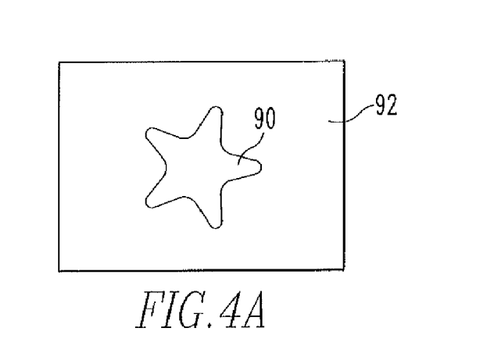
FIG. 4A is a plan view of a CCA image according to one embodiment of the present invention.
Figure 4B:
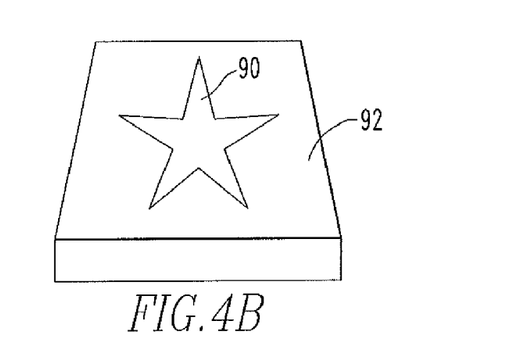
FIG. 4B is a perspective view of the CCA containing an image produced according to the present invention as shown in FIG. 4A.

In another embodiment of the invention, a mask may be used to create an image that is properly detected only when viewed at an angle to the imaging member. Referring to FIGS. 4A and 4B, the image 90 may be distorted when viewed on face to the imaging member 92, but when viewed at an angle to the imaging member, as in FIG. 4B, the image 90 is properly detectable. Such angle imaging may also be accomplished by using a focused laser directed into the interior of an array to likewise produce a distorted image that appears on face, yet exhibits a clear image on angle to the imaging member.

Figure 5:
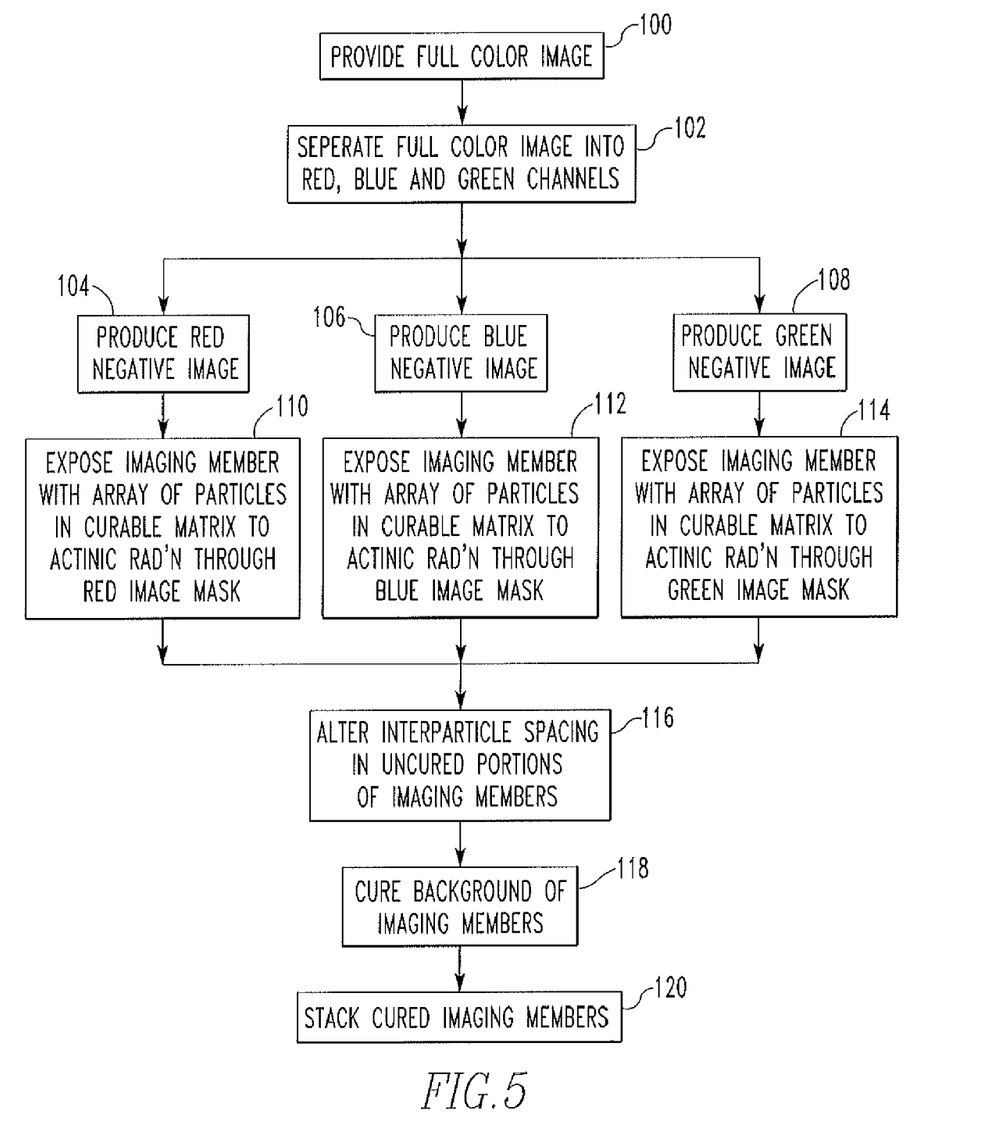
FIG. 5 is a flow chart of a method of producing a full-color image according to the method of the present invention.

The present invention also may be used to produce a multi-color image in an imaging member For example, as shown in FIG. 5, separate imaging members imaged corresponding to red, blue and green channel images are produced. A full-color image of the image to be produced is provided (step 100) and is separated into a red channel, a blue channel and a green channel, as is conventional in photolithography and digital photography (step 102). For each of the respective red, blue and green channels, a red negative image, a blue negative image and a green negative image are produced on a transparency at steps 104, 106 and 108. Each negative image transparency is used as a mask for exposing a periodic array of particles in a curable matrix to expose the matrix composition to actinic radiation through the negative images at steps 110, 112 and 114. Similar to the process outlined in FIG. 1A, the actinic radiation cures a portion of each of the three imaging members. The inter-particle spacing in each of the uncured portions of each of the imaging members is altered as at step 116 (as above, by expanding the particles, swelling the matrix, or both). The uncured backgrounds of the three imaged members are cured at step 118. In step 120, the resulting three imaged members are stacked together. Upon exposure to light, a full-color image is reproduced in the multi-layered stack of imaged members. A multi-color image as described herein is not limited to red, blue and green images overlaid to create a full-color image. Multi-color images may be used with two color (two-tone) images or more than three color images. Likewise, the images may be the positive of an image or the negative of an image.

The imaged members of the present invention may be provided on a support film or may be removed from a support film and be comminuted into individually imaged planchetts (large flakes, with planar dimensions on the order of 1-10 mm) or smaller flakes. Alternatively, the imaged members may be produced directly on an article, wherein a surface of the article functions as a substrate onto which the imaged member is produced.

The imaged members produced according to the present invention also may be applied to an article or other physical structure by a variety of techniques, such as using adhesives to attach a film bearing an imaged member to an article (as a decal or the like) or by hot stamping of a film bearing an imaged member or delivering an imaged member to an article. Suitable non-limiting techniques for delivering an imaged member to an article include providing the imaged member in a medium and applying the medium containing the imaged member to an article by brushing, spraying, wiping, dipping, sprinkling, electrodepositing, powder spraying, aerosol spraying, roll coating and printing (such as with a jet printer). The imaged member may be incorporated into an article by soaking an article with a medium (e.g., solvent or dispersant) containing the imaged member, wherein the imaged member soaks into and is incorporated into the article. The imaged members may be incorporated into woven articles (such as currency) by weaving threads bearing the imaged members into the woven material. Alternatively, the imaged members may be compounded into material for producing the article (such as a resinous material or pulp-type material). The article may be molded (including injection-molding) or extruded (including hot melt extrusion), whereby the imaged member is co-extruded with the article forming material. The imaged members of the present invention may also be provided on or incorporated into heat-shrinkable sleeves for wrapping around articles.

The imaged members produced according to the invention having an image may be used in marking devices, including documents of value, articles of manufacture and their packaging and credentials documents. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationary, lottery tickets, chips and/or tokens, controlled items (e.g., evidence), key cards, keys, tracing and tracking items and as a portion of barcodes. Articles of manufacture or packaging of articles of manufacture may include aircraft parts, automotive parts such as vehicle identification numbers, pharmaceutical products and personal care products, recorded media, clothing and footwear, electronic devices, batteries, ophthalmic devices, alcohol, food items, printing inks and printing consumables, writing implements, luxury items such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings and windows and transparencies. Examples of credentials which may bear the crystalline colloidal array produced according to the present invention include drivers' licenses, identification cards (government, corporate and educational) passports, visas, marriage certificates, hospital bracelets and diplomas. These examples are not meant to be limiting and are only a sampling of devices that may bear an image according to the present invention. These exemplary uses of an image are not meant to be limiting.

While the present invention is described herein in connection with producing images in crystalline colloidal arrays, this is not meant to be limiting. Other components may be imaged using actinic radiation. For example, a liquid crystal (LC) array provided in a curable matrix composition may be imaged by exposing the LC array to radiation (as described above, e.g., through a mask or with a laser) to cure a first portion of the LC array. The pitch of the LC molecules in the remaining (uncured) portion of the LC array is altered, such as by heating the LC array. The remaining portion is then cured, thereby fixing the pitch of the altered LC molecules. In this manner, the imaged LC array includes a portion with altered LC molecules that exhibit optical properties that are different from the optical properties of the LC molecules that were not altered.

In addition, the following examples are merely illustrative of the present invention and are not intended to be limiting.

EXAMPLES

Example 1

UV Laser Imaging

A curable matrix composition containing a UV acrylate monomer package (80% propoxylated neopentyl glycol diacrylate and about 20% butane diol diacrylate, with a photoinitiator) was placed on a black background of an opacity chart (byko-chart, BYK-Gardner USA). A film of polyethylene teraphthalate (PET) bearing an ordered array of latex particles was placed with the latex particles face down on top of the acrylate composition. The acrylate was spread to a thin film between the opacity chart and the array, in order to receive the curable acrylic composition within the array. The coated array and chart assembly was placed in the path of a UV laser that was moved to write an image, curing the regions that were illuminated by the UV laser. The opacity chart and the coated array (supported by the PET film) were heated to expand the particles. Expansion of the particles was evidenced by an increase in the reflectance as well as a change in the color of the uncured portions of the coated array. The entire coated array was exposed to a UV lamp to cure any uncured portions of the acrylic composition. The PET film was peeled away, leaving behind the crystalline colloidal array fixed in a polymerized acrylic matrix composition on the opacity chart, with a laser written image. When viewing the chart face on (normal to the chart) the laser written image appeared blue with the background appearing green. When viewing the chart at a glancing angle, the laser written image appeared black and the background appeared blue-violet.

Example 2

UV Laser Imaging

Example 1 was repeated, except that the array provided on the PET film was placed face up and the acrylate composition was applied onto the array. A PET cover sheet was placed on top. This assembly (PET/array/PET) was placed in a UV laser path to cure a first portion of the matrix in the configuration of an image. The imaged array was heated to expand the particles in the non-imaged portion, as in Example 1. The entire coated array was then exposed to UV radiation to cure the non-imaged portion. When viewing the film face on, placed on top of a black background, the laser written image appeared blue with the background appearing green. When viewing the film over a black background at a glancing angle, the laser written image appeared black and the background appeared blue-violet.

Example 3

High Detail CCA Imaging

A full-color image was converted to a negative, gray-scale image, using Adobe Photoshop. The negative image was printed with an ink jet printer onto a transparency to create a mask. A UV curable composition containing an epoxylated trimethyl propane triacrylate and propane diol triacrylate with an initiator was placed on a PET film. A PET film bearing a latex particle array was placed onto the acrylate mixture. The assembly was exposed to UV radiation through the mask to cure an image portion. The mask was removed and the assembly was heated until the uncured portion of the CCA exhibited an increased reflectance and a color change in the uncured regions of the coated array. The assembly was then exposed to a UV lamp to cure the uncured regions. An image corresponding to the transparency mask was visible in the CCA. The color of the background changed from red to bright green by changing the viewing orientation from face-on to a glancing angle. The image color changed from shades of orange to shades of very dark green by changing the viewing orientation from face-on to a glancing angle.

Example 4

Full Color Imaging

Red, green and blue channel images of a full-color image were produced using Adobe Photoshop. Each channel image was converted to a negative gray-scale image, and the negatives were each printed on a transparency in an inkjet printer. A UV curable acrylate mixture was applied to a PET film bearing a periodic array of latex particles. The coated array was placed on the black portion of an opacity chart (acrylate side down) and was heated until a desired color (red) was achieved. The red channel image mask was then placed over the PET layer and was UV cured through the mask. The mask and the PET layer were removed, and the remaining image was wiped with isopropanol to remove uncured acrylate.

A green channel image in a CCA was prepared in the same way on top of the red image. An array in a UV curable matrix composition was heated until a green color was achieved. The green channel image negative was used to expose the green coated array and cure the exposed matrix composition. A blue coated array was prepared and imaged similarly on top of the red and green layers. The three images red, green and blue were coated with a UV curable acrylate composition and was UV cured. The resulting image showed a highly detailed, full-color image. The palette of colors seen in the image changed as the viewing orientation changed from face on to glancing angle.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A method of producing an image comprising:
providing an imaging member comprising an array of elements received within a curable matrix composition;
curing the matrix composition in a first portion of the imaging member by projecting laser radiation onto said first portion in the configuration of an image, such that the first cured portion exhibits a first optical property;
altering another portion of the imaging member; and
curing the other portion of the matrix composition, such that the other cured portion exhibits a different optical property from the first portion, wherein the array of elements comprises an ordered array of particles, and wherein the first cured portion diffracts radiation at a first wavelength and the other cured portion diffracts radiation at another wavelength.

2. The method of claim 1, further comprising curing another portion of the matrix composition, wherein each cured portion diffracts radiation at a wavelength that differs from the wavelengths of diffraction for the other cured portions.

3. The method of claim 1, further comprising altering an inter-particle spacing in the other portion prior to curing the other portion.

4. The method of claim 3, wherein altering the inter-particle spacing comprises swelling the particles in the other portion or swelling the matrix composition in the other portion or both.

5. The method of claim 1, wherein the laser radiation is produced from a laser device that is moved across the imaging member in the configuration of the image.

6. The method of claim 5, wherein the step of curing the matrix composition in the first portion comprises rastering the laser radiation across the array.

7. The method of claim 1, wherein said step of curing the first portion comprises directing laser radiation onto the first portion at an angle to the imaging member to produce an image that is detectable when the array is viewed at said angle.

8. The method of claim 1, wherein said step of curing the first portion comprises directing laser radiation through a mask onto the imaging member.

9. The method of claim 1, wherein the matrix composition is curable with ultraviolet radiation and comprises a plurality of cure initiators, each said cure initiator being responsive to a different wavelength of ultraviolet radiation and, wherein said step of curing a first portion of the matrix composition comprises projecting laser radiation at a first wavelength onto the matrix composition to cause a first initiator to initiate curing of the first portion and said step of curing a second portion of the matrix composition comprises projecting radiation at a second wavelength onto the matrix composition to cause a second initiator to initiate curing of the second portion.

10. A device bearing an image produced according to claim 1, wherein said device comprises a document of value, an article of manufacture, packaging for an article of manufacture and/or a credentials document.

11. A method of producing an image comprising:
   providing an array of elements received within a curable matrix composition;
   curing a first portion of the matrix composition through a grey-scale positive or negative mask of an image; and
   curing another portion of the matrix composition, wherein the array of elements comprises an ordered array of particles, and wherein the first cured portion diffracts radiation at a first wavelength and the other cured portion diffracts radiation at another wavelength.

12. The method of claim 11, wherein the mask is configured to produce the image in the array when viewed at an angle and a distorted version of the image when viewed substantially on face to the array.

13. The method of claim 11, wherein the matrix composition is cured by ultraviolet radiation.

14. The method of claim 13, wherein the matrix composition comprises an acrylic polymer.

15. The method of claim 11, wherein the image is detectable when exposed to visible radiation.

16. The method of claim 11, wherein the image is detectable when exposed to invisible radiation.

17. A device bearing an image in a curable member produced according to claim 11, wherein said device comprises a document of value, an article of manufacture, packaging for an article of manufacture and/or a credentials document.

18. The device of claim 17, wherein the image is a full-color image.

19. A method of producing a multi-color image in a crystalline colloidal array comprising:
   providing a plurality of imaging members, each imaging member comprising an ordered array of particles received within a curable matrix composition;
   providing an image mask for each imaging member;
   exposing each imaging member to actinic radiation through one of the image masks to produce a plurality of imaged members, each imaged member having a cured image portion and an uncured background portion;
   curing the uncured portions of the imaged members such that the cured image portion and the cured background portion diffract radiation at differing wavelengths; and
   stacking the imaged members such that the diffraction of radiation from the cured image portions yields a full-color image.

20. The method of claim 19, further comprising altering the inter-particle spacings in the uncured background portions prior to curing thereof.

21. A display member exhibiting a full-color image, the display member being produced according to the method of claim 19.

* * * * *